United States Patent
Huang et al.

(10) Patent No.: US 11,784,646 B1
(45) Date of Patent: Oct. 10, 2023

(54) COMBINED FUNCTION IC CELL DEVICE, LAYOUT, AND METHOD

(71) Applicants: TAIWAN SEMICONDUCTOR MANUFACTURING COMPANY, LTD., Hsinchu (TW); TSMC NANJING COMPANY, LIMITED, Nanjing (CN)

(72) Inventors: Ying Huang, Hsinchu (TW); Changlin Huang, Hsinchu (TW); Jing Ding, Hsinchu (TW); Qingchao Meng, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 0 days.

(21) Appl. No.: 17/830,601

(22) Filed: Jun. 2, 2022

(30) Foreign Application Priority Data

May 27, 2022 (CN) .......................... 202210585532.0

(51) Int. Cl.
  *H03K 19/0185* (2006.01)
  *G06F 30/392* (2020.01)
  *G06F 119/06* (2020.01)

(52) U.S. Cl.
  CPC ... *H03K 19/018521* (2013.01); *G06F 30/392* (2020.01); *G06F 2119/06* (2020.01)

(58) Field of Classification Search
  CPC ... H03K 19/018521; H03K 19/018507; H03K 19/018528; H03K 19/0185; G06F 30/392; G06F 2119/06; G06F 30/39
  See application file for complete search history.

(56) References Cited

U.S. PATENT DOCUMENTS

| 7,260,442 | B2 | 8/2007 | Hwang et al. |
| 9,256,709 | B2 | 2/2016 | Yu et al. |
| 2014/0040838 | A1 | 2/2014 | Liu et al. |
| 2015/0278429 | A1 | 10/2015 | Chang |
| 2018/0075182 | A1* | 3/2018 | Zhuang ............... H01L 27/0207 |

\* cited by examiner

*Primary Examiner* — Jung Kim
(74) *Attorney, Agent, or Firm* — Hauptman Ham, LLP

(57) ABSTRACT

An integrated circuit (IC) device includes first and second power rails extending in a first direction, a third power rail extending in the first direction between the first and second power rails, gate structures extending perpendicular to the first direction, each of two endmost gate structures extending continuously between endpoints underlying the first and second power rails, and first through fourth pluralities of active areas extending in the first direction between the endmost gate structures. Active areas of each of the first through fourth pluralities of active areas are aligned in the first direction, a first portion of the gate structures and first through fourth pluralities of active areas is configured as a functional circuit, and a second portion of the gate structures and first through fourth pluralities of active areas is configured as one of a decoupling capacitor or an antenna diode.

20 Claims, 9 Drawing Sheets

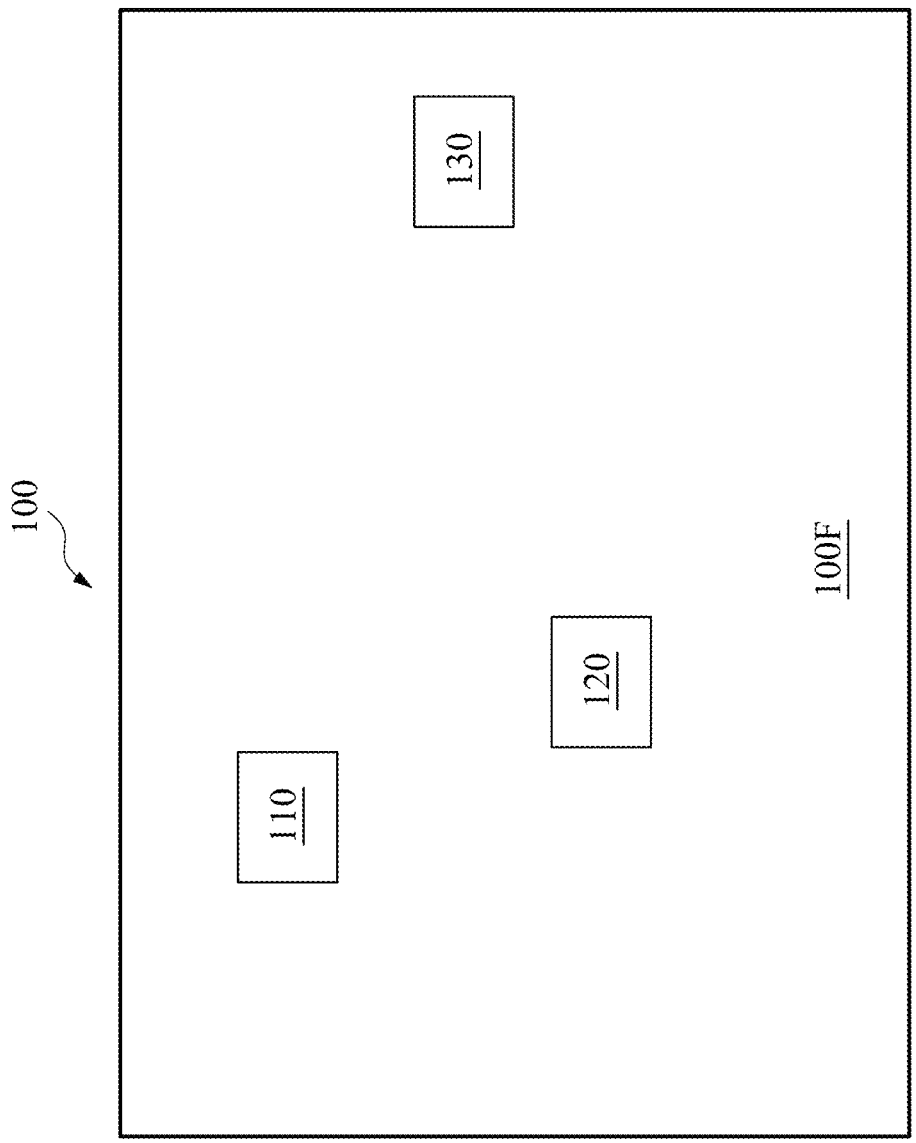

COMBINED FUNCTION IC CELL DEVICE, LAYOUT, AND METHOD

BACKGROUND

The ongoing trend in miniaturizing integrated circuits (ICs) has resulted in progressively smaller devices which consume less power, yet provide more functionality at higher speeds than earlier technologies. Such miniaturization has been achieved through design and manufacturing innovations tied to increasingly strict specifications. Various electronic design automation (EDA) tools are used to generate, revise, and verify designs for semiconductor devices while ensuring that IC structure design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 1 is a diagram of a plan view of an IC layout and corresponding IC device, in accordance with some embodiments.

DETAILED DESCRIPTION

Figure 2A:
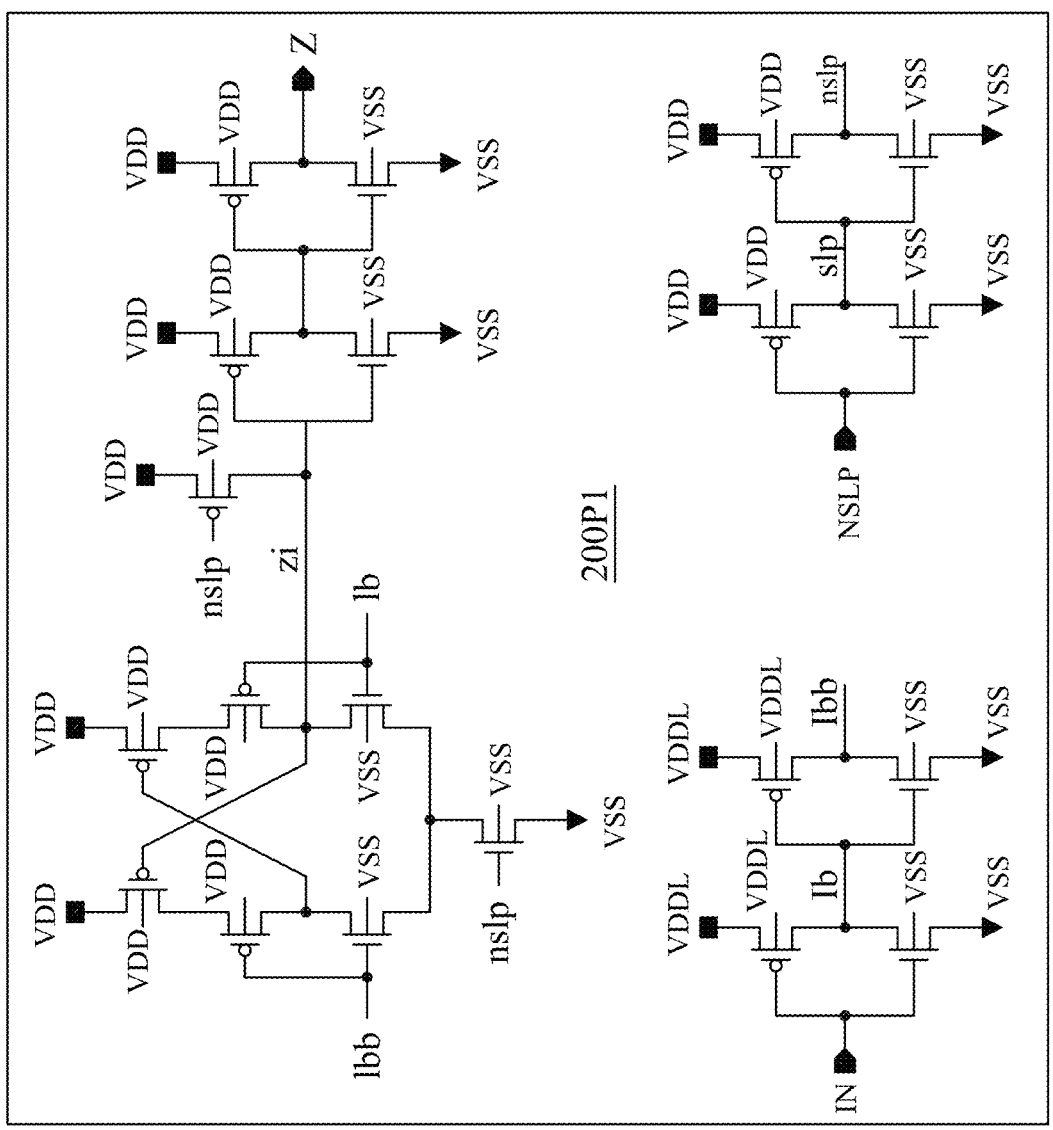
FIG. 2A is a schematic diagram of an IC cell and corresponding IC device, in accordance with some embodiments.

The following disclosure provides many different embodiments, or examples, for implementing different features of the provided subject matter. Specific examples of components, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In various embodiments, an IC device based on an IC layout diagram includes at least one IC device based on a layout cell in which a first portion includes elements configured as a primary functional circuit, e.g., a level shifter, and a second portion includes elements configured as a secondary functional circuit, e.g., one of a decoupling capacitor or an antenna diode. Compared to approaches in which cells configured as decoupling capacitors and antenna diodes are separate from those configured as primary functional circuits, overall IC device space is reduced.

Figure 2B:
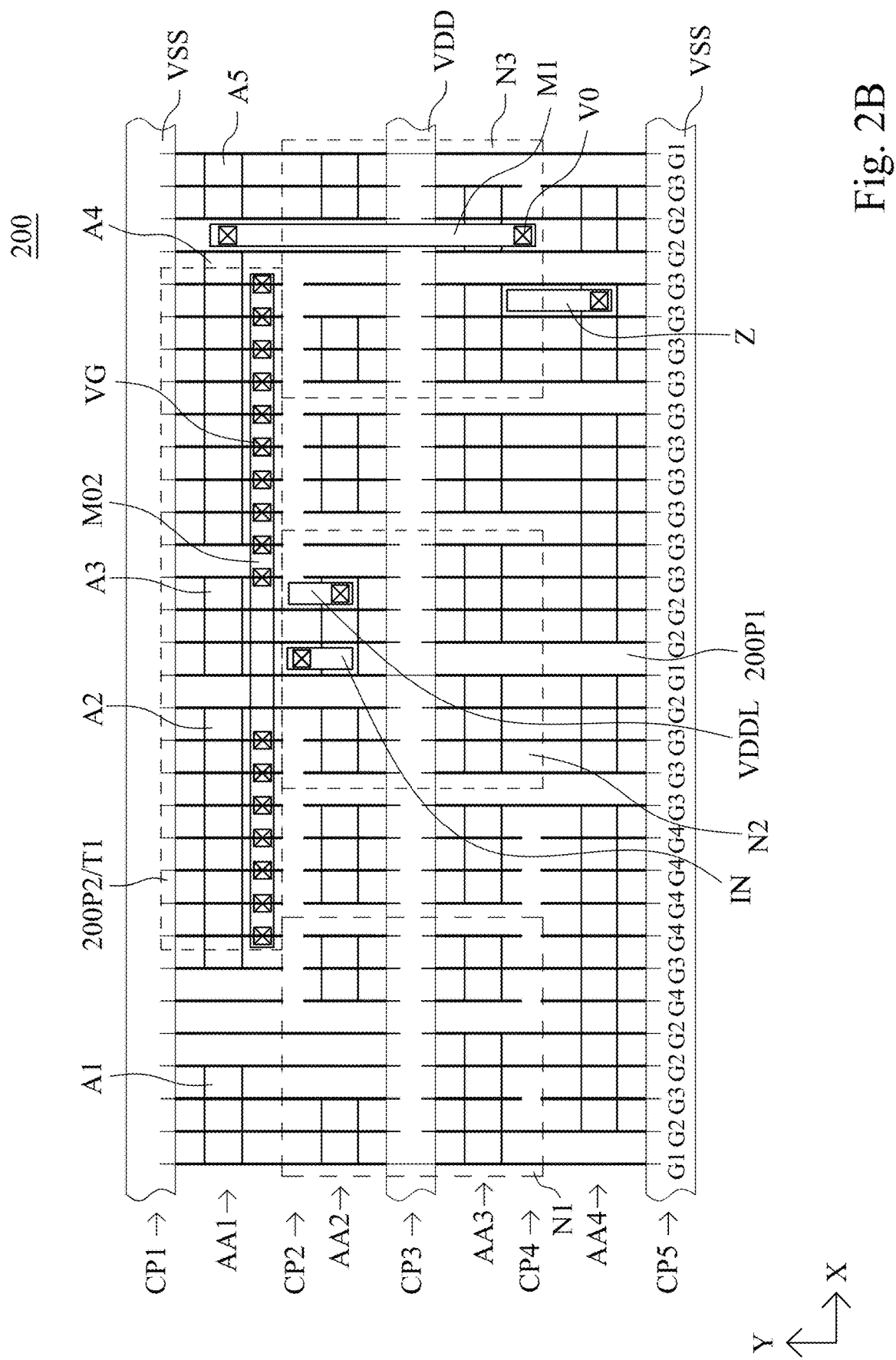
FIG. 2B is a diagram of a plan view of an IC cell and corresponding IC device, in accordance with some embodiments.
Figure 3A:
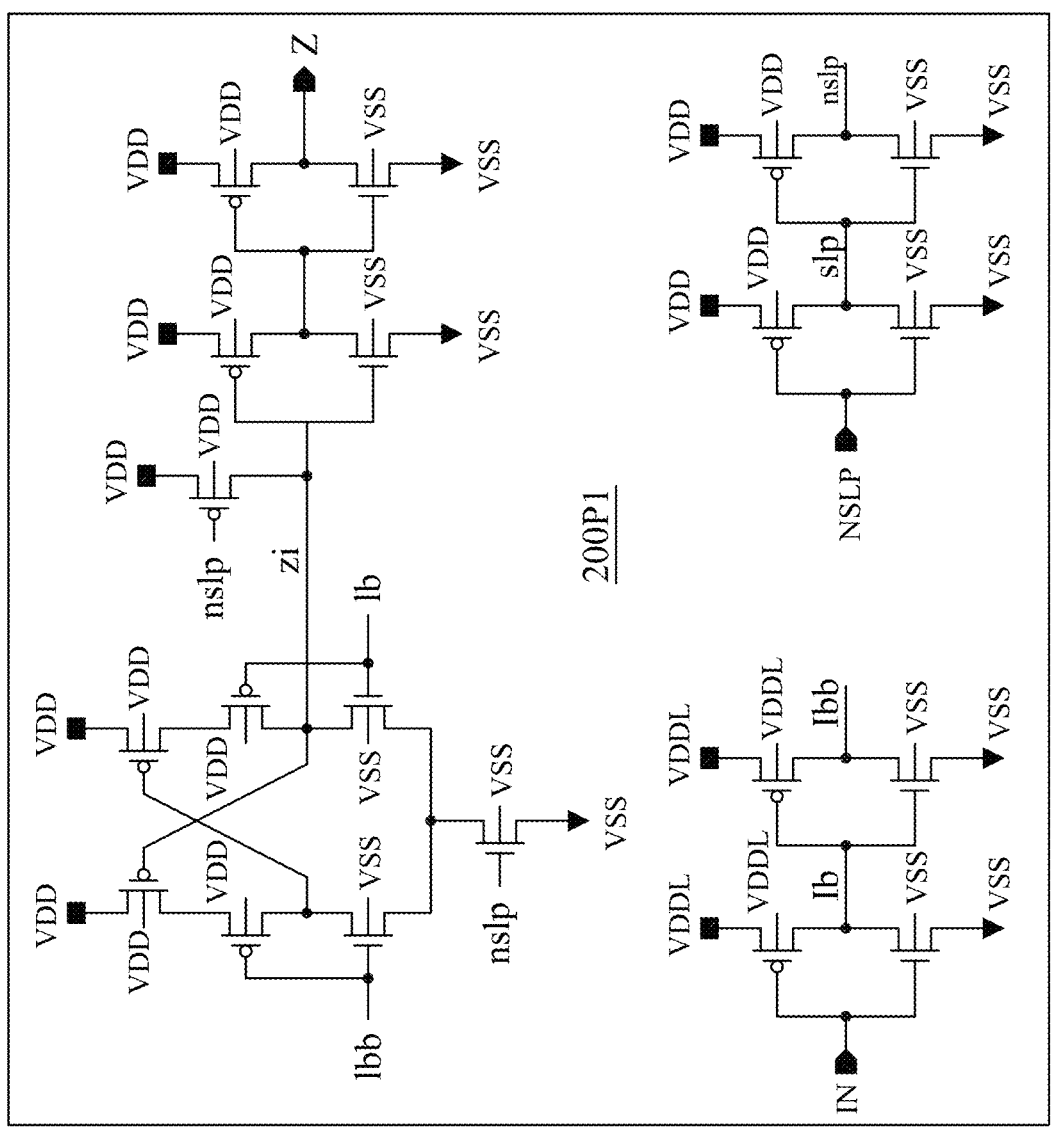
FIG. 3A is a schematic diagram of an IC cell and corresponding IC device, in accordance with some embodiments.
Figure 3B:
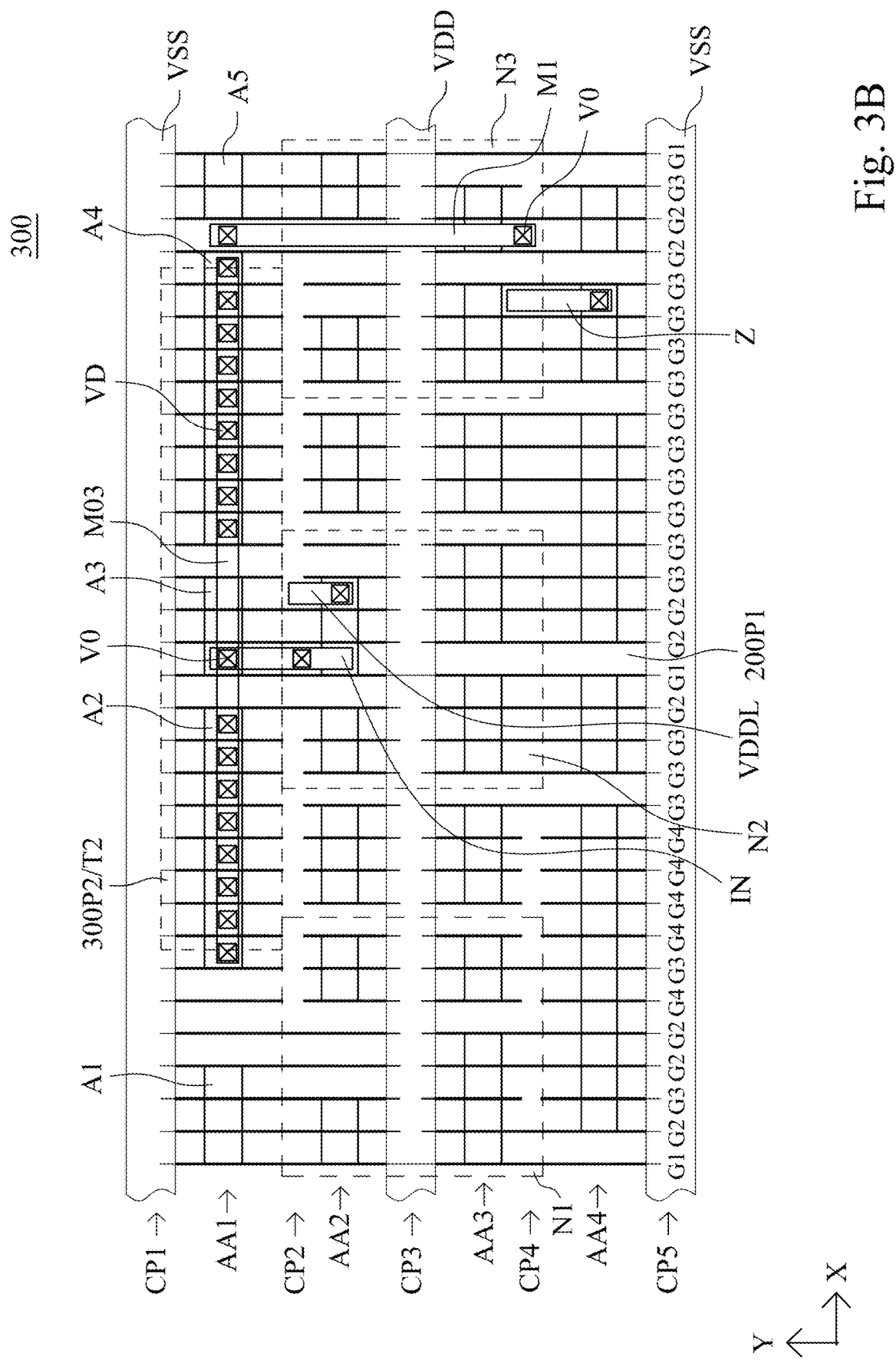
FIG. 3B is a diagram of a plan view of an IC cell and corresponding IC device, in accordance with some embodiments.

As discussed below, FIGS. 1, 2B, and 3B depict plan views in some embodiments. Each of FIGS. 1, 2B, and 3B is a device/layout diagram in which the reference designators represent both IC device features and the IC layout features used to at least partially define the corresponding IC device features in a manufacturing process, e.g., a method 400 discussed below with respect to FIG. 4 and/or an IC manufacturing flow associated with an IC manufacturing system 700 discussed below with respect to FIG. 7. In some embodiments, one or more of FIG. 1, 2B, or 3B is some or all of an IC layout diagram generated by executing some or all of the operations of a method 500 discussed below with respect to FIG. 5. Accordingly, each of FIGS. 1, 2B, and 3B represents a plan view of both an IC layout diagram and a corresponding IC device.

Each of the figures herein, e.g., FIGS. 1, 2B, and 3B, is simplified for the purpose of illustration. The figures are views of IC structures and devices with various features included and excluded to facilitate the discussion below. In various embodiments, an IC structure, device and/or layout diagram includes one or more features corresponding to power distribution structures, metal interconnects, contacts, vias, gate structures, source/drain (S/D) structures, or other transistor elements, isolation structures, or the like, in addition to the features depicted in FIGS. 1, 2B, and 3B.

FIG. 1 is a diagram of a plan view of an IC layout 100 and corresponding IC device 100, in accordance with some embodiments. In addition to the top-level plan view of IC layout/device 100, FIG. 1 includes X and Y directions.

IC layout/device 100 includes a region 100F and cells/devices 110, 120, and 130. Region 100F includes an arrangement of cells and corresponding devices (not shown individually) having various sizes and dimensions in accordance with being functional circuits configured to perform predetermined functions, e.g., logic, computation, data and signal processing, data storage, or the like. In some embodiments, a cell is referred to as a layout or layout component. The cells/devices of region 100F have rectangular shapes including widths in the X direction and heights in the Y direction (not shown). In some embodiments, region 100F includes multiple power domains corresponding to the various functions of the cells/devices, e.g., one or more domains having a memory power supply voltage level greater than a power supply voltage level of one or more other domains including signal processing devices.

Each of cells/devices 110, 120, and 130 is an IC cell and corresponding IC device having a rectangular shape and including features configured as both a functional circuit, also referred to as a first functional circuit, and one of a decoupling capacitor or an antenna diode, also referred to as a second functional circuit. In some embodiments, the first functional circuit of one or more of cells/devices 110, 120, or 130 is a level shifter: a low-to-high level shifter configured to convert signals from a first to second power domain in which the second power domain has a power supply voltage level greater than that of the first power domain; or a high-to-low level shifter configured to convert signals from a first to second power domain in which the first power domain has a power supply voltage level greater than that of the second power domain.

In some embodiments, one or more of cells/devices 110, 120, or 130 is a cell/device 200 including features configured as both the first functional circuit and a decoupling capacitor discussed below with respect to FIGS. 2A and 2B. In some embodiments, one or more of cells/devices 110, 120, or 130 is a cell/device 300 including features configured as both the first functional circuit and an antenna diode discussed below with respect to FIGS. 3A and 3B.

The number of cells/devices 110, 120, and 130 depicted in FIG. 1 is a non-limiting example provided for the purpose of illustration. In various embodiments, IC layout/device 100 does not include one or more of cells/devices 110, 120, or 130, or includes one or more cells/devices (not shown) in addition to cells/devices 110, 120, and 130.

The positioning and relative sizes of cells/devices 110, 120, and 130 within layout/device 100 depicted in FIG. 1 is a non-limiting example provided for the purpose of illustration. In various embodiments, IC layout/device 100 includes cells/devices, e.g., cells/devices 110, 120, and 130, otherwise positioned and/or sized within layout/device 100, e.g., positioned along an edge of layout/device 100.

FIG. 2A is a schematic diagram of IC cell/device 200, in accordance with some embodiments, and FIG. 3A is a schematic diagram of IC cell/device 300, in accordance with some embodiments.

Each of IC cells/devices 200 and 300 includes a first portion 200P1 and a corresponding second portion 200P2 or 300P2. First portion 200P1 includes p-type metal oxide semiconductor (PMOS) and n-type metal oxide semiconductor (NMOS) transistors (not labeled) configured as a level shifter, also referred to as level shifter 200P1 in some embodiments.

A first subset of the PMOS and NMOS transistors of level shifter 200P1 is configured to operate in a first power domain including a power supply voltage VDDL and a power supply reference voltage VSS. The first subset includes an inverter configured to receive an input signal IN and generate a signal Ib, and an inverter configured to receive signal Ib and generate a signal Ibb.

A second subset of the PMOS and NMOS transistors of level shifter 200P1 is configured to operate in a second power domain including a power supply voltage VDD and a power supply reference voltage VSS. Power supply voltage VDD has a power-on voltage level greater than a power-on voltage level of power supply voltage VDDL. The second subset includes an inverter configured to receive an input signal NSLP and generate a signal slp, and an inverter configured to receive signal slp and generate a signal nslp.

The second subset also includes a level-shifting arrangement of PMOS and NMOS transistors configured to receive complementary signals Ib and Ibb and generate a signal zi on an internal node (not labeled). The level-shifting arrangement is selectively coupled to power supply reference voltage VSS through an NMOS transistor configured to receive signal nslp, and the internal node is selectively coupled to power supply voltage VDD through a PMOS transistor configured to receive signal nslp. A pair of inverters is configured to receive signal zi and generate an output signal Z.

Level shifter 200P1 is thereby configured to, in operation, receive and buffer signal IN in the first power domain, and buffer and generate signal Z in the second power domain based on signal IN. In some embodiments, level shifter 200P1 is configured to receive and buffer signal IN and buffer and generate signal Z as clock signals.

Level shifter 200P1 is thereby configured further to, in operation, receive and buffer signal NSLP in the second power domain, and responsive to signal NSLP, enable and disable the signal buffering and generation in the second power domain. In some embodiments, level shifter 200P1 is configured to receive signal NSLP as a sleep mode or low-power enable signal.

Second portion 200P2, also referred to as decoupling capacitor 200P2 or decap 200P2 in some embodiments, includes an NMOS transistor T1 including a gate configured to receive power supply voltage VDD, and each of source, drain, and substrate terminals configured to receive power supply reference voltage VSS. Transistor T1 is thereby configured as a capacitive device including a gate capacitance coupled between power supply voltage VDD received at the gate and power supply reference voltage VSS received at each of the other terminals. In operation, the gate capacitance acts to decouple noise from adjacent functional circuits, e.g., level shifter 200P1, configured to receive power supply voltage VDD.

In some embodiments, transistor T1 includes a plurality of NMOS transistors configured in parallel such that a total capacitance of transistor T1 is equal to a sum of the gate capacitances of each transistor of the plurality of NMOS transistors. As a number of parallel transistors of transistor T1 increases, the total capacitance of transistor T1 thereby also increases such that the capacity to decouple power supply voltage VDD noise also increases.

In some embodiments, the number of parallel transistors of transistor T1 ranges from five to 50. In some embodiments, the number of parallel transistors of transistor T1 ranges from 15 to 30.

Second portion 300P2, also referred to as antenna diode 300P2 in some embodiments, includes an NMOS transistor T2 including a gate and each of source and drain terminals configured to receive input signal IN, and a substrate terminal configured to receive power supply reference voltage VSS. Transistor T2 is thereby configured as a diode device including a forward conduction path from signal IN received at the gate and source and drain terminals to power supply reference voltage VSS received at the substrate terminal. In operation, the forward conduction path acts to divert potentially damaging current levels at inputs to adjacent functional circuits, e.g., level shifter 200P1, configured to receive input signal IN.

In some embodiments, transistor T2 includes a plurality of NMOS transistors configured in parallel such that a total current diverting capacity of transistor T2 is equal to a sum of the current diverting capacities of each transistor of the plurality of NMOS transistors. As a number of parallel transistors of transistor T2 increases, the total capacity of transistor T2 to divert potentially damaging current levels from input signal IN also increases.

In some embodiments, the number of parallel transistors of transistor T2 ranges from five to 50. In some embodiments, the number of parallel transistors of transistor T2 ranges from 15 to 30.

FIG. 2B is a diagram of a plan view of IC cell/device 200, in accordance with some embodiments, and FIG. 3B is a diagram of a plan view of IC cell/device 300, in accordance with some embodiments. The embodiments depicted in FIGS. 2B and 3B are non-limiting examples of respective IC cells/devices 200 and 300 provided for the purpose of illustration. Other configurations of IC cell/device 200 and/or 300, e.g., including a functional circuit other than a level shifter or including fewer or greater numbers of parallel transistors, are within the scope of the present disclosure.

Each of IC cells/devices 200 and 300 includes n-well regions/structures N1-N3 positioned in a semiconductor wafer (not labeled), pluralities of active regions/areas AA1 to AA4 extending in the X direction in the semiconductor wafer, instances of each of gate regions/structures G1-G4 extending in the Y direction, power rails VSS and VDD extending in the X direction, and instances of via regions/structures V0 and metal regions/segments M1 (single instances labeled for clarity) extending in the Y direction. An instance of metal region/segment M1 is configured to receive power supply voltage VDDL, an instance of metal region/segment M1 is configured to receive input signal IN, and an instance of metal region/segment M1 is configured to carry output signal Z. Plurality of active regions/areas AA1 includes active regions/areas A1-A5 aligned in the X direction, and pluralities of active regions/areas AA2-AA4 include active regions/areas that are not labeled for the purpose of clarity.

IC cell/device 200 also includes instances of via regions/structures VG and a metal region/segment M02 extending in the X direction, and IC cell/device 300 also includes instances of via regions/structures VD and a metal region/segment M03 extending in the X direction.

As discussed below, a first portion of the features of each of IC cells/devices 200 and 300 corresponds to portion 200P1, a second portion of the features of IC cell/device 200 corresponds to portion 200P2, and a second portion of the features of IC cell/device 300 corresponds to portion 300P2.

A well/region, e.g., an n-well N1-N3, is a region in an IC layout diagram corresponding to an IC device, e.g., IC cell/device 200 or 300, included in a manufacturing process as part of defining a well, i.e., a continuous portion of a semiconductor wafer, e.g., a silicon (Si) wafer or an epitaxial Si layer, suitable for forming one or more IC devices, e.g., IC devices 100-300. In various embodiments, a well is a p-well based on the semiconductor portion including one or more acceptor dopants, e.g., boron (B) or aluminum (Al), or an n-well based on the semiconductor portion including one or more donor dopants, e.g., phosphorous (P) or arsenic (As). In the embodiments depicted herein, each of IC cells/devices 200 and 300 includes n-wells N1-N3. In various embodiments, an IC cell/device 200 and/or 300 includes one or more p-wells in addition to or instead of one or more of n-wells N1-N3, includes one or more n-wells in addition to n-wells N1-N3, and/or does not include one or more of n-wells N1-N3.

N-well N2 corresponds to the first power domain and each of n-wells N1 and N3 corresponds to the second power domain. N-well N2 is separated from n-wells N1 and N3 in the X direction by one or more distances in accordance with minimum spacing rules of the manufacturing process corresponding to latch-up prevention based on power supply voltage levels of the first and second power domains.

An active area/region, e.g., an active area of pluralities of active areas AA1-AA4, is a region in the IC layout diagram included in the manufacturing process as part of defining an active area, also referred to as an oxide diffusion or definition (OD), in the semiconductor wafer, either directly or in one of n-wells N1-N3, in which one or more IC device features, e.g., a source/drain structure (not shown), is formed. In some embodiments, an active area is an n-type or p-type active area of a planar transistor, a fin field-effect transistor (FinFET), or a gate-all-around (GAA) transistor. In various embodiments, an active area (structure) includes one or more of a semiconductor material, e.g., silicon (Si), silicon-germanium (SiGe), silicon-carbide (SiC), or the like, an acceptor or donor dopant material, or another suitable material.

In some embodiments, an active area is a region in an IC layout diagram included in the manufacturing process as part of defining a nano-sheet structure, e.g., a continuous volume of one or more layers of one or more semiconductor materials having either n-type or p-type doping. In various embodiments, individual nano-sheet layers include a single monolayer or multiple monolayers of a given semiconductor material.

Each of pluralities of active regions/areas AA1 and AA4 includes n-type active regions/areas adjacent to an instance of power rail VSS, and each of pluralities of active regions/areas AA1 and AA4 includes p-type active regions/areas positioned in corresponding n-wells N1-N3 adjacent to power rail VDD.

A gate region/structure, e.g., a gate regions/structures G1-G4, is a region in the IC layout diagram included in the manufacturing process as part of defining a gate structure. A gate structure is a volume including one or more conductive segments, e.g., a gate electrode, including one or more conductive materials, e.g., polysilicon, copper (Cu), aluminum (Al), tungsten (W), cobalt (Co), ruthenium (Ru), or one or more other metals or other suitable materials, substantially surrounded by one or more insulating materials, the one or more conductive segments thereby being configured to control a voltage provided to an adjacent gate dielectric layer.

A dielectric layer, e.g., a gate dielectric layer, is a volume including one or more insulating materials, e.g., silicon dioxide, silicon nitride ($Si_3N_4$), and/or one or more other suitable material such as a low-k material having a k value less than 3.8 or a high-k material having a k value greater than 3.8 or 7.0 such as aluminum oxide ($Al_2O_3$), hafnium oxide ($HfO_2$), tantalum pentoxide ($Ta_2O_5$), or titanium oxide ($TiO_2$), suitable for providing a high electrical resistance between IC structure elements, i.e., a resistance level above a predetermined threshold corresponding to one or more tolerance levels of a resistance-based effect on circuit performance.

Gate regions/structures G1-G4 have configurations along the Y direction in accordance with cut-gate regions CP1-CP5 (borders not depicted in FIGS. 2B and 3B for the purpose of clarity), also referred to as cut-poly regions CP1-CP5 in some embodiments. A cut-gate region is a region in the IC layout diagram included in the manufacturing process as part of defining a discontinuity in the gate electrode of a given gate structure, thereby electrically isolating the corresponding adjacent portions of the gate electrode from each other.

Each of cut-gate regions CP1 and CP5 extends continuously across the widths of each of IC cells/devices 200 and 300 in the X direction such that each of gate regions/structures G1-G4 has endpoints in the Y direction overlapping/underlying the instances of power rails VSS.

Each of cut-gate regions CP2-CP4 includes multiple portions extending across the widths of each of IC cells/devices 200 and 300 in the X direction such that the instances of gate regions/structures G1-G4 have from zero through three discontinuities in the Y direction. Each instance of gate region/structure G1 has zero discontinuities corresponding to the portions of cut-gate regions CP2-CP4 and includes a single gate electrode extending in the Y direction between the instances of power rail VSS. Each instance of gate region/structure G2 has one discontinuity corresponding to a portion of one of cut-gate regions CP2-CP4 and includes a total of two gate electrode portions extending in the Y direction between the instances of power rail VSS. Each instance of gate region/structure G3 has two discontinuities corresponding to portions of two of cut-gate regions CP2-CP4 and includes a total of three gate electrode portions extending in the Y direction between the instances of power rail VSS. Each instance of gate region/structure G4 has three discontinuities corresponding to portions of three of cut-gate regions CP2-CP4 and includes a total of four gate electrode portions extending in the Y direction between the instances of power rail VSS.

The number and positions of cut-gate regions CP1-CP5 are non-limiting examples provided for the purpose of illustration. In various embodiments, one or both of IC cells/devices 200 or 300 includes gate regions/structures having portions based on fewer or greater than five cut-gate regions and/or based on cut-gate regions at locations other than those depicted in FIGS. 2B and 3B.

A metal region/segment, e.g., a metal region/segment M02, M03, or M1 or power rail VSS or VDD, is a region in the IC layout diagram included in the manufacturing process as part of defining a metal segment structure including one or more conductive materials in a given metal layer of the manufacturing process. In various embodiments, each of power rails VSS and VDD corresponds to a first metal layer, metal regions/segments M02 and M03 correspond to the first metal layer, and/or metal regions/segments M1 corresponds to a second metal layer of the manufacturing process.

A via region/structure, e.g., a via region/structure VD, VG, or V0, is a region in the IC layout diagram included in the manufacturing process as part of defining a via structure including one or more conductive materials configured to provide an electrical connection between an overlying conductive structure, e.g., a power rail or other metal segment, and an underlying conductive structure. The underlying structure corresponds to a S/D structure in the case of a via region/structure VD, a gate electrode in the case of a via region/structure VG, and a first metal layer region/segment, e.g., metal region/segment M02 or M03, in the case of a via region/structure V0. The depictions of via regions/structures VD in FIG. 3B are considered to include the underlying S/D structures which are not separately depicted for the purpose of clarity.

Portion 200P1 includes n-wells N1-N3, active regions/areas A1 and A5 of plurality of active regions/areas AA1, each of pluralities of active regions/areas AA2-AA4, the portions of gate regions/structures G1-G4 outside the boundary of portion 200P2 or 300P2, the instances of metal regions/segments M1 and via regions/structures V0, and additional features that are not depicted for the purpose of clarity. The various features are configured as pluralities of PMOS and NMOS transistors (not labeled) arranged in accordance with the schematic diagrams of FIGS. 2A and 3A discussed above such that portion 200P1 includes a functional circuit, e.g., a level shifter.

The locations and configurations of the instances of metal regions/segments M1 of portion 200P1 corresponding to power supply voltage VDDL, input signal IN, and output signal Z depicted in FIGS. 2B and 3B are non-limiting examples provided for the purpose of illustration. In various embodiments, portion 200P1 includes instances of metal regions/segments M1 corresponding to one or more of power supply voltage VDDL, input signal IN, or output signal Z otherwise configured in accordance with the schematic diagrams of FIGS. 2A and 3A.

Horizontal boundaries of portion 200P1 correspond to endmost instances of gate regions/structures G1-G4, each of the endmost instances being an instance of gate region/structure G1 extending continuously in the Y direction between the instances of power rail VSS. Each of pluralities of active regions/areas AA1-AA4 extends in the X direction between the endmost instances of gate regions/structures G1-G4, the endmost instances thereby defining a width of each of portion 200P1 and IC cells/devices 200 and 300 in the X direction (not labeled).

Based on the minimum spacing rules and widths of n-wells N1-N3, portion 200P1 and IC cells/devices 200 and 300 have the width sufficiently large such that portions of the features of each of IC cells/devices 200 and 300 are unused in the level shifter of FIGS. 2A and 3A, and at least some of the unused features correspond to either portion 200P2 of IC cell/device 200 or portion 300P2 of IC cell/device 300.

Portion 200P2 of IC cell/device 200 includes active regions/areas A2-A4 of plurality of active regions/areas AA1, the portions of gate regions/structures G1-G4 inside the boundary of portion 200P2, metal region/segment M02, instances of via regions/structures VG, configured in accordance with the schematic diagram of FIG. 2A as discussed below.

Portion 200P2 includes an electrical connection (not shown for the purpose of clarity) between metal region/segment M02 and a metal region/segment configured to carry power supply voltage VDD, e.g., power rail VDD. Each instance of via region/structure VG is positioned between and configured to electrically connect metal region/segment M02 and an underlying gate structure portion of gate regions/structures G1-G4. Based on cut-gate region CP2, each of the corresponding gate structure portions is aligned in the Y direction with, and electrically isolated from, a gate structure portion of the portions of gate regions/structures G1-G4 included in portion 200P1.

Portion 200P2 includes one or more electrical connections (not shown for the purpose of clarity) from substrate portions and S/D structures (not shown for the purpose of clarity) of active regions A2-A4 adjacent to the corresponding gate structure portions to one or more metal regions/segments configured to carry power supply reference voltage VSS, e.g., an instance of power rail VSS.

The features of portion 200P2 are thereby arranged as transistor T1 including a plurality of NMOS transistors configured in parallel as a decoupling capacitor. In the embodiment depicted in FIG. 2B, transistor T1 includes a total of seventeen parallel transistors. In some embodiments, transistor T1 includes fewer or greater than seventeen parallel transistors, as discussed above with respect to FIG. 2A.

Portion 300P2 of IC cell/device 300 includes active regions/areas A2-A4 of plurality of active regions/areas AA1, the portions of gate regions/structures G1-G4 inside the boundary of portion 300P2, metal region/segment M03, instances of via regions/structures VD, configured in accordance with the schematic diagram of FIG. 3A as discussed below.

Portion 300P2 includes the instance of metal region/segment configured to carry input signal IN electrically connected to metal region/segment M03 through an instance of via region/structure V0. Each instance of via region/structure VD is positioned between and configured to electrically connect metal region/segment M03 and an underlying S/D structure adjacent to a portion of gate regions/structures G1-G4. Based on cut-gate region CP2, each of the corresponding gate structure portions is aligned in the Y direction with, and electrically isolated from, a gate structure portion of the portions of gate regions/structures G1-G4 included in portion 200P1. In some embodiments, portion 300P2 includes instances of via region/structure VG (not shown) positioned between and configured to electrically connect metal region/segment M03 (or another parallel and similarly configured metal region/segment—not shown) and the corresponding gate structure portions.

Portion 300P2 includes one or more electrical connections (not shown for the purpose of clarity) from substrate portions adjacent to the corresponding S/D structures to one or more metal regions/segments configured to carry power supply reference voltage VSS, e.g., an instance of power rail VSS.

The features of portion 300P2 are thereby arranged as transistor T2 including a plurality of NMOS transistors configured in parallel as an antenna diode. In the embodiment depicted in FIG. 3B, transistor T2 includes a total of fifteen parallel transistors. In some embodiments, transistor T1 includes fewer or greater than fifteen parallel transistors, as discussed above with respect to FIG. 3A.

Each of IC cell/device 200 and 300 thereby includes portion 200P1 including features configured as a primary functional circuit, e.g., a level shifter, and portion 200P2 or 300P2 including features configured as a secondary functional circuit, e.g., decoupling capacitor T1 or antenna diode T2. Compared to approaches in which cells configured as decoupling capacitors and antenna diodes are separate from those configured as primary functional circuits, overall IC device space is thereby reduced.

In some embodiments in which a cell/device includes a decoupling capacitor, e.g., cell/device 200 including decoupling capacitor T1, device space is reduced by 23% while an increase in power supply voltage VDD leakage is limited to 0.5%, a total power increase is limited to 2.5%, a delay increase is limited to 0.6%, and other device performance metrics are not significantly affected, compared to other approaches. In some embodiments in which a cell/device includes an antenna diode, e.g., cell/device 300 including antenna diode T2, device space is reduced by 25% while other device performance metrics are not significantly affected, compared to other approaches.

Figure 4:
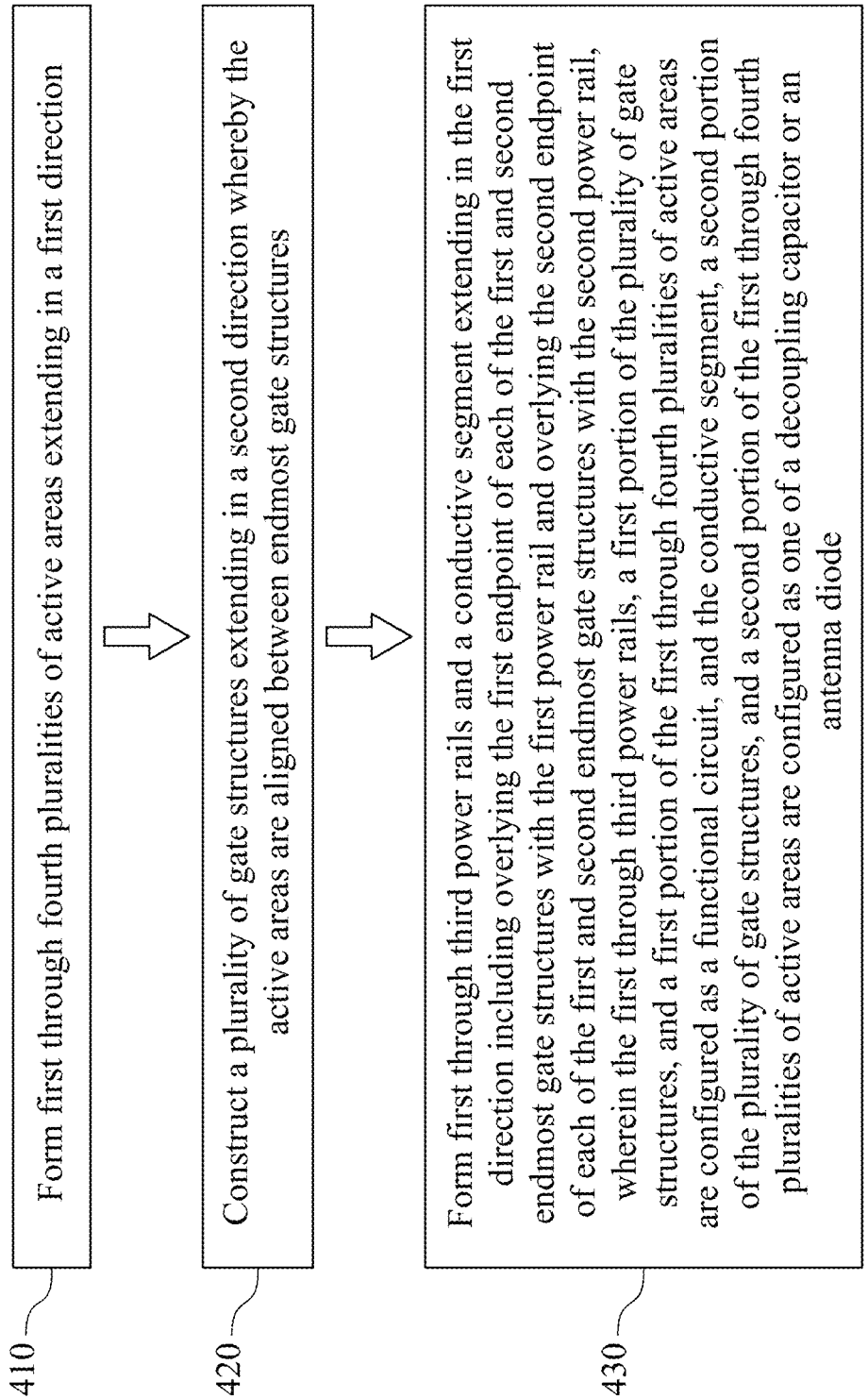
FIG. 4 is a flowchart of a method of manufacturing an IC device, in accordance with some embodiments.

FIG. 4 is a flowchart of a method 400 of manufacturing an IC device, in accordance with some embodiments. Method 400 is operable to form IC device 100 discussed above with respect to FIG. 1, and/or IC devices 200 and/or 300 discussed above with respect to FIGS. 2A-3B.

In some embodiments, the operations of method 400 are performed in the order depicted in FIG. 4. In some embodiments, the operations of method 400 are performed in an order other than the order depicted in FIG. 4. In some embodiments, one or more additional operations are performed before, during, and/or after the operations of method 400. In some embodiments, performing some or all of the operations of method 400 includes performing one or more operations as discussed below with respect to IC manufacturing system 700 and FIG. 7.

At operation 410, in some embodiments, first through fourth pluralities of active areas extending in a first direction are formed. In some embodiments, forming the first through fourth pluralities of active areas includes forming pluralities of active areas AA1-AA4 discussed above with respect to FIGS. 1-3B.

In some embodiments, forming the first through fourth pluralities of active areas includes forming the second and third pluralities of active areas in one or more n-wells, e.g., n-wells N1-N3 discussed above with respect to FIGS. 1-3B.

In some embodiments, forming the first through fourth pluralities of active areas includes performing one or more implantation processes in areas of a semiconductor wafer corresponding to the first through fourth pluralities of active areas, whereby predetermined doping concentrations and types are achieved for one or more given dopants as discussed above with respect to FIGS. 2B and 3B.

In some embodiments, forming the first through fourth pluralities of active areas includes forming a plurality of S/D structures in and/or on some or all of the active areas of the first through fourth pluralities of active areas, e.g., by performing one or more implantation processes and/or one or more deposition processes.

At operation 420, in some embodiments, a plurality of gate structures extending in a second direction is constructed whereby the active areas of the first through fourth pluralities of active areas are aligned between endmost gate structures of the plurality of gate structures. In some embodiments, constructing the plurality of gate structures includes constructing gate structures G1-G4 discussed above with respect to FIGS. 1-3B.

In some embodiments, constructing the plurality of gate structures includes performing a plurality of manufacturing operations, e.g., one or more of a lithography, diffusion, deposition, etching, planarizing, or other operation suitable for constructing the plurality of gate structures as discussed above with respect to FIGS. 2B and 3B.

At operation 430, in some embodiments, first through third power rails and a conductive segment extending in the first direction are formed by overlying the first endpoint of each of the first and second endmost gate structures with the first power rail and overlying the second endpoint of each of the first and second endmost gate structures with the second power rail.

In some embodiments, forming the first through third power rails includes forming instances of power rails VSS and power rail VDD discussed above with respect to FIGS. 2B and 3B. In some embodiments, forming the conductive segment extending in the first direction includes forming metal segment M02 discussed above with respect to FIG. 2B or metal segment M03 discussed above with respect to FIG. 3B.

In some embodiments, forming a metal segment, e.g., the first through third power rails or conductive segment, includes performing a plurality of manufacturing operations including depositing and patterning one or more photoresist layers, performing one or more etching processes, and performing one or more deposition processes whereby one or more conductive materials are configured to form a continuous, low resistance structure.

The first through third power rails, a first portion of the plurality of gate structures, and a first portion of the first through fourth pluralities of active areas are configured as a functional circuit, and the conductive segment, a second portion of the plurality of gate structures, and a second portion of the first through fourth pluralities of active areas are configured as one of a decoupling capacitor or an antenna diode.

In some embodiments, the first through third power rails, first portion of the plurality of gate structures, and first portion of the first through fourth pluralities of active areas are configured as the functional circuit including a level shifter, e.g., portion 200P1 discussed above with respect to FIGS. 2A-3B.

In some embodiments, the conductive segment and the second portions of the plurality of gate structures and first through fourth pluralities of active areas are configured as the decoupling capacitor including decoupling capacitor 200P2 discussed above with respect to FIG. 2B.

In some embodiments, forming the first through third power rails and the conductive segment includes configuring the decoupling capacitor by constructing vias between gate structures of the second portion of the plurality of gate structures and the conductive segment and forming an electrical connection between the conductive segment and the third power rail, e.g., constructing via structures VG and forming an electrical connection to metal segment M02 as discussed above with respect to FIG. 2B.

In some embodiments, forming the first through third power rails and the conductive segment includes configuring the conductive segment and the second portions of the plurality of gate structures and first through fourth pluralities of active areas as the antenna diode by configuring antenna diode 300P2 discussed above with respect to FIG. 3B.

In some embodiments, configuring the antenna diode includes constructing vias between S/D structures in active areas of the second portion of the first plurality of active areas and the conductive segment and forming an electrical connection between the conductive segment and a signal node of the level shifter, e.g., constructing via structures VD and forming an electrical connection to metal segment M03 as discussed above with respect to FIG. 3B.

In some embodiments, an active area of the second portion of the first plurality of active areas is aligned between active areas of the first portion of the first plurality of active areas, e.g., active areas A2-A4 aligned between active areas A1 and A5 as discussed above with respect to FIGS. 2B and 3B.

In some embodiments, the plurality of gate structures includes discontinuities between gate structures of the first portion of the plurality of gate structures and gate structures of the second portion of the plurality of gate structures, e.g., discontinuities in gate structures G1-G4 in accordance with cut-gate regions CP1-CP5 as discussed above with respect to FIGS. 2B and 3B.

In some embodiments, the functional circuit and the one of the decoupling capacitor or the antenna diode are configured as part of building a plurality of IC devices, e.g., transistors, logic gates, memory cells, interconnect structures, and/or other suitable devices, by performing a plurality of manufacturing operations, e.g., one or more of a lithography, diffusion, deposition, etching, planarizing, or other operation suitable for building the plurality of IC devices in the semiconductor wafer.

By performing some or all of the operations of method 400, an IC device is manufactured in which a first portion includes features configured as a primary functional circuit, e.g., a level shifter, and a second portion includes features configured as a decoupling capacitor or antenna diode, thereby obtaining the benefits discussed above with respect to IC devices 100-300.

Figure 5:
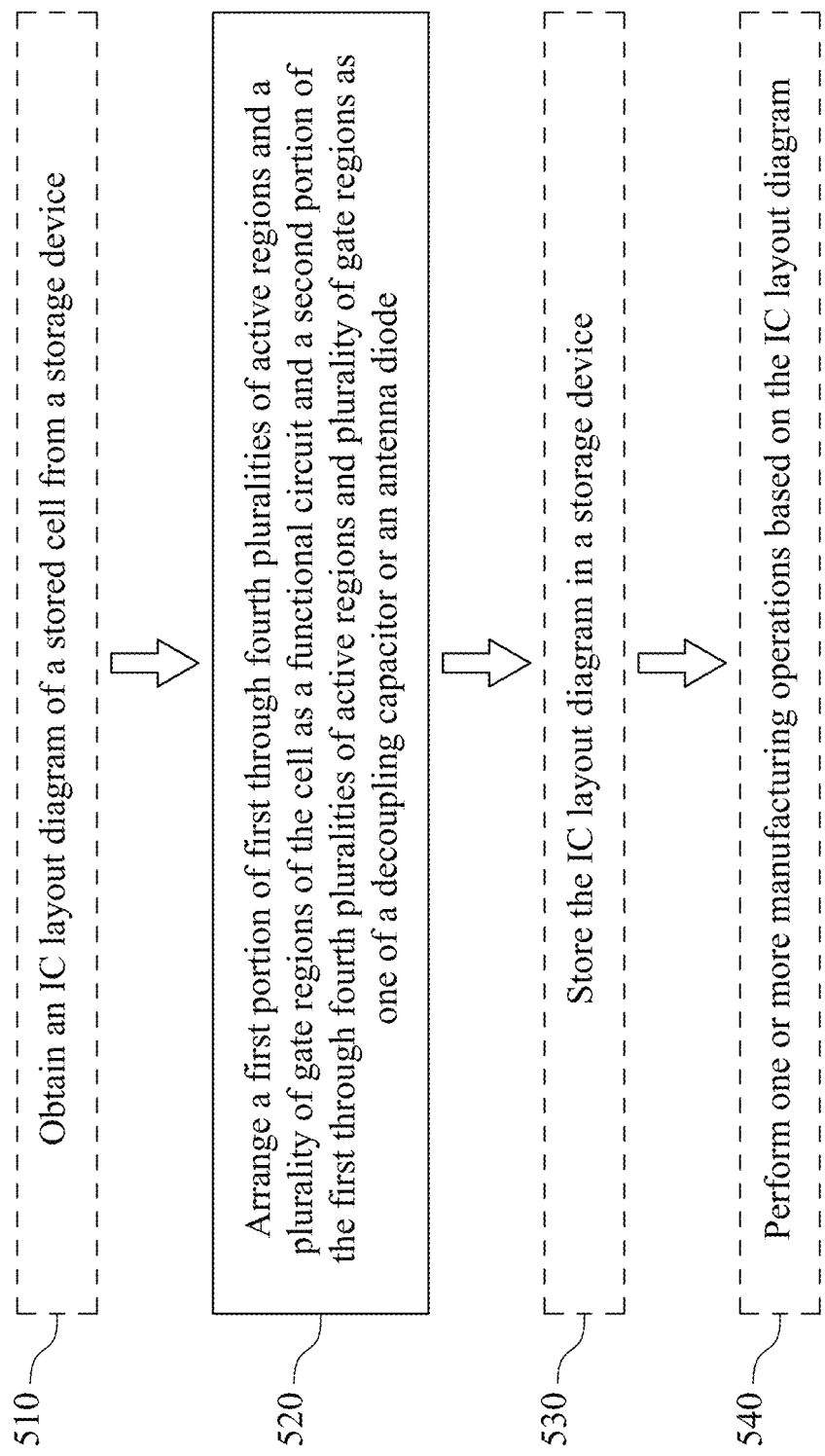
FIG. 5 is a flowchart of a method of generating an IC layout diagram, in accordance with some embodiments.

FIG. 5 is a flowchart of a method 500 of generating an IC layout diagram, e.g., an IC layout diagram 100 discussed above with respect to FIG. 1 and/or a cell 200 and/or 300 discussed above with respect to FIGS. 2A-3B, in accordance with some embodiments.

In some embodiments, generating the IC layout diagram includes generating the IC layout diagram corresponding to an IC device, e.g., an IC device 100-300 discussed above with respect to FIGS. 1-3B, manufactured based on the generated IC layout diagram.

In some embodiments, some or all of method 500 is executed by a processor of a computer, e.g., a processor 602 of an IC layout diagram generation system 600, discussed below with respect to FIG. 6.

Some or all of the operations of method 500 are capable of being performed as part of a design procedure performed in a design house, e.g., a design house 720 discussed below with respect to FIG. 7.

In some embodiments, the operations of method 500 are performed in the order depicted in FIG. 5. In some embodiments, the operations of method 500 are performed simultaneously and/or in an order other than the order depicted in FIG. 5. In some embodiments, one or more operations are performed before, between, during, and/or after performing one or more operations of method 500.

At operation 510, in some embodiments, an IC layout diagram of a stored cell is obtained from a storage device, the stored cell including a functional circuit, e.g., a level shifter.

In some embodiments, obtaining the IC layout diagram of the stored cell from the storage device includes obtaining the IC layout diagram of the stored cell from cell library 607 of IC layout diagram generation system 600, discussed below with respect to FIG. 6.

At operation 520, a first portion of first through fourth pluralities of active regions and a plurality of gate regions of the cell are arranged as a functional circuit and a second portion of the first through fourth pluralities of active regions and plurality of gate regions are arranged as one of a decoupling capacitor or an antenna diode. In various embodiments, arranging the first portion as the functional circuit includes retaining an arrangement of the stored cell obtained from the storage device, modifying the arrangement of the stored cell, or performing an arrangement without obtaining the stored cell from the storage device.

Arranging the first portion of first through fourth pluralities of active regions and plurality of gate regions of the cell as the functional circuit and the second portion of the first through fourth pluralities of active regions and plurality of gate regions as the one of the decoupling capacitor or the antenna diode includes arranging the first portion of first through fourth pluralities of active regions AA1-AA4 and plurality of gate regions G1-G4 and power rails VSS and VDD as portion 200P1 and either the second portion of first through fourth pluralities of active regions AA1-AA4 and plurality of gate regions G1-G4 and metal region M02 and via regions VG as portion 200P2 as discussed above with respect to FIG. 2B or the second portion of first through fourth pluralities of active regions AA1-AA4 and plurality of gate regions G1-G4 and metal region M03 and via regions VD as portion 300P2 as discussed above with respect to FIG. 3B.

At operation 530, in some embodiments, the IC layout diagram is stored in a storage device. In various embodiments, storing the IC layout diagram in the storage device includes storing the IC layout diagram in a non-volatile, computer-readable memory or a cell library, e.g., a database, and/or includes storing the IC layout diagram over a network. In some embodiments, storing the IC layout diagram in the storage device includes storing the IC layout diagram in cell library 607 or over network 614 of IC layout diagram generation system 600, discussed below with respect to FIG. 6.

At operation 540, in some embodiments, one or more manufacturing operations are performed based on the IC layout diagram. In some embodiments, performing one or more manufacturing operations includes performing one or more lithographic exposures based on the IC layout diagram. Performing one or more manufacturing operations, e.g., one or more lithographic exposures, based on the IC layout diagram is discussed above with respect to FIG. 4 and below with respect to FIG. 7.

By executing some or all of the operations of method 500, an IC layout diagram is generated corresponding to an IC device in which a first portion includes features configured as a primary functional circuit, e.g., a level shifter, and a second portion includes features configured as a decoupling capacitor or antenna diode, thereby obtaining the benefits discussed above with respect to IC devices 100-300.

Figure 6:
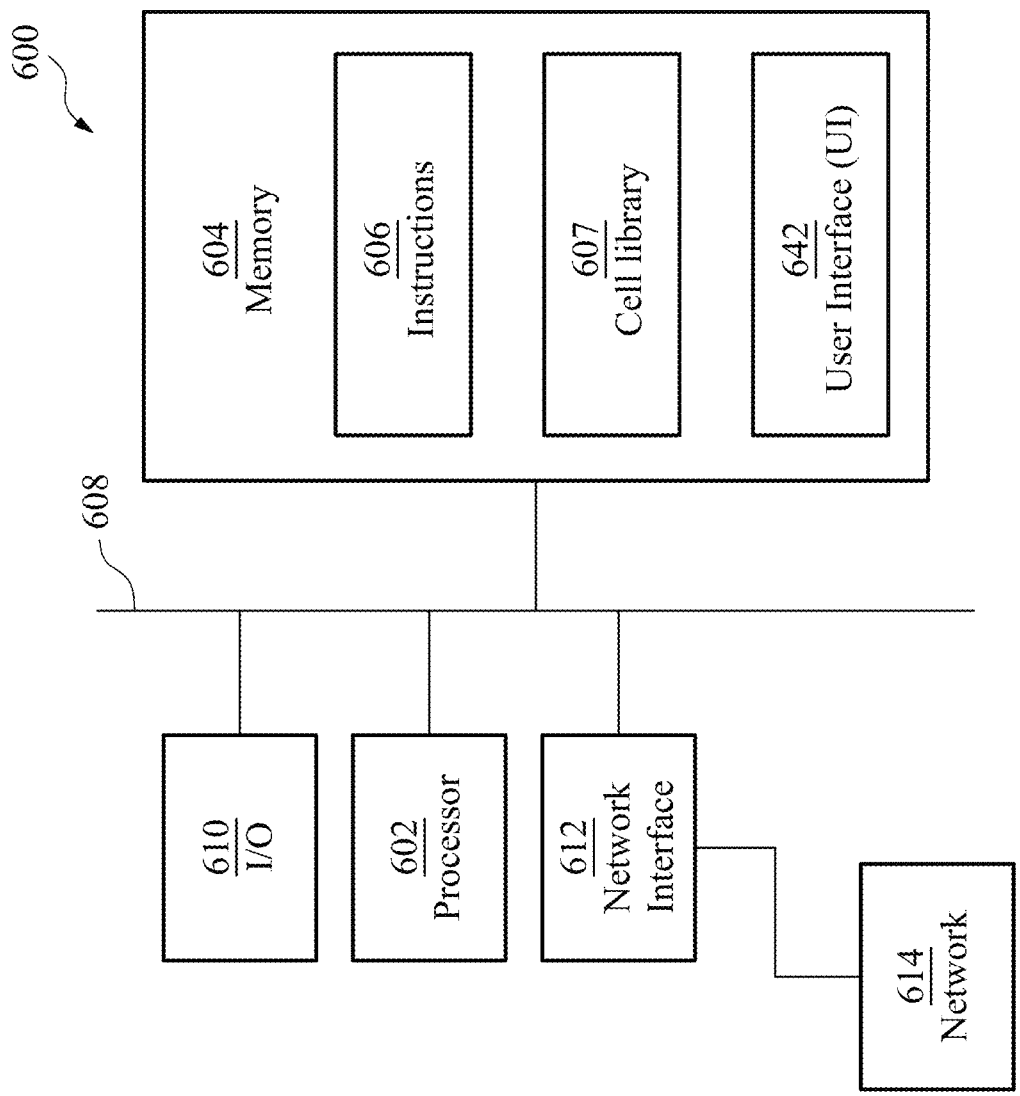
FIG. 6 is a block diagram of an IC layout diagram generation system, in accordance with some embodiments.

FIG. 6 is a block diagram of IC layout diagram generation system 600, in accordance with some embodiments. Methods described herein of designing IC layout diagrams in accordance with one or more embodiments are implementable, for example, using IC layout diagram generation system 600, in accordance with some embodiments.

In some embodiments, IC layout diagram generation system 600 is a general purpose computing device including a hardware processor 602 and a non-transitory, computer-readable storage medium 604. Storage medium 604, amongst other things, is encoded with, i.e., stores, computer program code 606, i.e., a set of executable instructions. Execution of instructions 606 by hardware processor 602 represents (at least in part) an EDA tool which implements a portion or all of a method, e.g., method 500 of generating an IC layout diagram described above with respect to FIG. 5 and/or method 700 of generating an IC layout diagram described above with respect to FIG. 7 (hereinafter, the noted processes and/or methods).

Processor 602 is electrically coupled to computer-readable storage medium 604 via a bus 608. Processor 602 is also electrically coupled to an I/O interface 610 by bus 608. A network interface 612 is also electrically connected to processor 602 via bus 608. Network interface 612 is connected to a network 614, so that processor 602 and computer-readable storage medium 604 are capable of connecting to external elements via network 614. Processor 602 is configured to execute computer program code 606 encoded in computer-readable storage medium 604 in order to cause IC layout diagram generation system 600 to be usable for performing a portion or all of the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, computer-readable storage medium 604 stores computer program code 606 configured to cause IC layout diagram generation system 600 (where such execution represents (at least in part) the EDA tool) to be usable for performing a portion or all of the noted processes and/or methods. In one or more embodiments, computer-readable storage medium 604 also stores information which facilitates performing a portion or all of the noted processes and/or methods. In one or more embodiments, computer-readable storage medium 604 stores cell library 607 of cells including such cells as disclosed herein, e.g., cells 110-130, 200, and 300 discussed above with respect to FIGS. 1-5.

IC layout diagram generation system 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

IC layout diagram generation system 600 also includes network interface 612 coupled to processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more IC layout diagram generation systems 600.

IC layout diagram generation system 600 is configured to receive information through I/O interface 610. The information received through I/O interface 610 includes one or more of instructions, data, design rules, libraries of standard cells, and/or other parameters for processing by processor 602. The information is transferred to processor 602 via bus 608. IC layout diagram generation system 600 is configured to receive information related to a UI through I/O interface 610. The information is stored in computer-readable medium 604 as user interface (UI) 642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by IC layout diagram generation system 600. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 7:
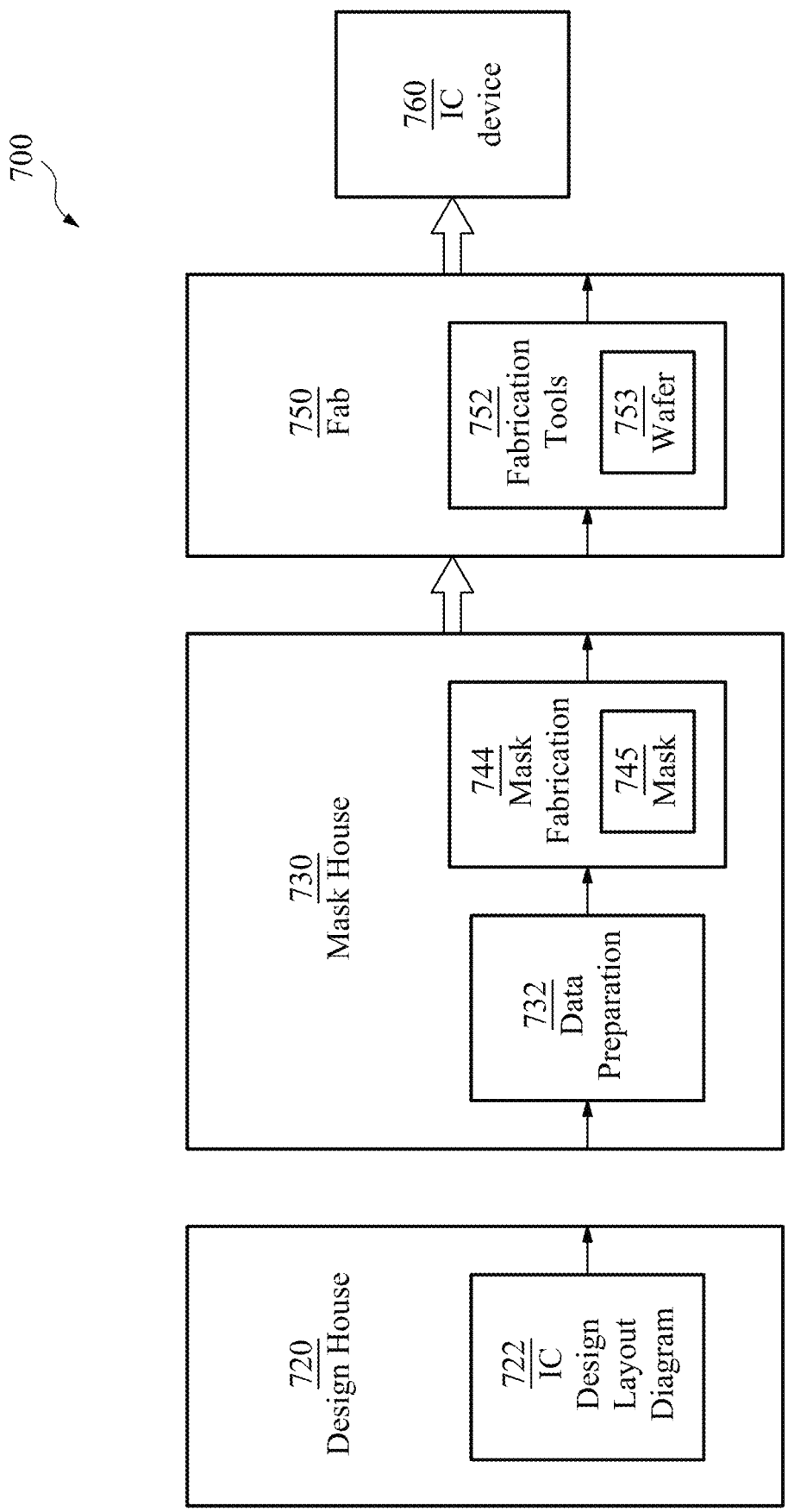
FIG. 7 is a block diagram of an IC manufacturing system, and an IC manufacturing flow associated therewith, in accordance with some embodiments.

FIG. 7 is a block diagram of IC manufacturing system 700, and an IC manufacturing flow associated therewith, in accordance with some embodiments. In some embodiments, based on an IC layout diagram, at least one of (A) one or more semiconductor masks or (B) at least one component in a layer of a semiconductor integrated circuit is fabricated using manufacturing system 700.

In FIG. 7, IC manufacturing system 700 includes entities, such as a design house 720, a mask house 730, and an IC manufacturer/fabricator ("fab") 750, that interact with one another in the design, development, and manufacturing cycles and/or services related to manufacturing an IC device 760. The entities in system 700 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 720, mask house 730, and IC fab 750 is owned by a single larger company. In some embodiments, two or more of design house 720, mask house 730, and IC fab 750 coexist in a common facility and use common resources.

Design house (or design team) 720 generates an IC design layout diagram 722. IC design layout diagram 722 includes various geometrical patterns, e.g., a cell 110-130, 200 and/or 300 and/or IC layout diagram 100 discussed above with respect to FIGS. 1-5. The geometrical patterns correspond to patterns of metal, oxide, or semiconductor layers that make up the various components of IC device 760 to be fabricated. The various layers combine to form various IC features. For example, a portion of IC design layout diagram 722 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 720 implements a proper design procedure to form IC design layout diagram 722. The design procedure includes one or more of logic design, physical design or place and route. IC design layout diagram 722 is presented in one or more data files having information of the geometrical patterns. For example, IC design layout diagram 722 can be expressed in a GDSII file format or DFII file format.

Mask house 730 includes data preparation 732 and mask fabrication 744. Mask house 730 uses IC design layout diagram 722 to manufacture one or more masks 745 to be used for fabricating the various layers of IC device 760 according to IC design layout diagram 722. Mask house 730 performs mask data preparation 732, where IC design layout diagram 722 is translated into a representative data file (RDF). Mask data preparation 732 provides the RDF to mask fabrication 744. Mask fabrication 744 includes a mask writer. A mask writer converts the RDF to an image on a substrate, such as a mask (reticle) 745 or a semiconductor wafer 753. The design layout diagram 722 is manipulated by mask data preparation 732 to comply with particular characteristics of the mask writer and/or requirements of IC fab 750. In FIG. 7, mask data preparation 732 and mask fabrication 744 are illustrated as separate elements. In some embodiments, mask data preparation 732 and mask fabrication 744 can be collectively referred to as mask data preparation.

In some embodiments, mask data preparation 732 includes optical proximity correction (OPC) which uses lithography enhancement techniques to compensate for image errors, such as those that can arise from diffraction, interference, other process effects and the like. OPC adjusts IC design layout diagram 722. In some embodiments, mask data preparation 732 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 732 includes a mask rule checker (MRC) that checks the IC design layout diagram 722 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 722 to compensate for limitations during mask fabrication 744, which may undo part of the modifications performed by OPC in order to meet mask creation rules.

In some embodiments, mask data preparation 732 includes lithography process checking (LPC) that simulates processing that will be implemented by IC fab 750 to fabricate IC device 760. LPC simulates this processing based on IC design layout diagram 722 to create a simulated manufactured device, such as IC device 760. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 722.

It should be understood that the above description of mask data preparation 732 has been simplified for the purposes of clarity. In some embodiments, data preparation 732 includes additional features such as a logic operation (LOP) to modify the IC design layout diagram 722 according to manufacturing rules. Additionally, the processes applied to IC design layout diagram 722 during data preparation 732 may be executed in a variety of different orders.

After mask data preparation 732 and during mask fabrication 744, a mask 745 or a group of masks 745 are fabricated based on the modified IC design layout diagram 722. In some embodiments, mask fabrication 744 includes performing one or more lithographic exposures based on IC design layout diagram 722. In some embodiments, an electron-beam (e-beam) or a mechanism of multiple e-beams is used to form a pattern on a mask (photomask or reticle) 745 based on the modified IC design layout diagram 722. Mask 745 can be formed in various technologies. In some embodiments, mask 745 is formed using binary technology. In some embodiments, a mask pattern includes opaque regions and transparent regions. A radiation beam, such as an ultraviolet (UV) or EUV beam, used to expose the image sensitive material layer (e.g., photoresist) which has been coated on a wafer, is blocked by the opaque region and transmits through the transparent regions. In one example, a binary mask version of mask 745 includes a transparent substrate (e.g., fused quartz) and an opaque material (e.g., chromium) coated in the opaque regions of the binary mask. In another example, mask 745 is formed using a phase shift technology. In a phase shift mask (PSM) version of mask 745, various features in the pattern formed on the phase shift mask are configured to have proper phase difference to enhance the resolution and imaging quality. In various examples, the phase shift mask can be attenuated PSM or alternating PSM. The mask(s) generated by mask fabrication 744 is used in a variety of processes. For example, such a mask(s) is used in an ion implantation process to form various doped regions in semiconductor wafer 753, in an etching process to form various etching regions in semiconductor wafer 753, and/or in other suitable processes.

IC fab 750 is an IC fabrication business that includes one or more manufacturing facilities for the fabrication of a variety of different IC products. In some embodiments, IC Fab 750 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 750 includes wafer fabrication tools 752 configured to execute various manufacturing operations on semiconductor wafer 753 such that IC device 760 is fabricated in accordance with the mask(s), e.g., mask 745. In various embodiments, fabrication tools 752 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 750 uses mask(s) 745 fabricated by mask house 730 to fabricate IC device 760. Thus, IC fab 750 at least indirectly uses IC design layout diagram 722 to fabricate IC device 760. In some embodiments, semiconductor wafer 753 is fabricated by IC fab 750 using mask(s) 745 to form IC device 760. In some embodiments, the IC fabrication includes performing one or more lithographic exposures based at least indirectly on IC design layout diagram 722. Semiconductor wafer 753 includes a silicon substrate or other proper substrate having material layers formed thereon. Semiconductor wafer 753 further includes one or more of various doped regions, dielectric features, multi-level interconnects, and the like (formed at subsequent manufacturing steps).

Details regarding an IC manufacturing system (e.g., system 700 of FIG. 7), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

In some embodiments, an IC device includes first and second power rails extending in a first direction, wherein each of the first and second power rails is configured to carry a power supply reference voltage, a third power rail extending in the first direction between the first and second power rails, wherein the third power rail is configured to carry a power supply voltage, a plurality of gate structures extending in a second direction perpendicular to the first direction, wherein each of a first endmost gate structure and a second endmost gate structure of the plurality of gate structures extends continuously from a first endpoint underlying the first power rail to a second endpoint underlying the second power rail, and first through fourth pluralities of active areas extending in the first direction between the first and second endmost gate structures of the plurality of gate structures, the active areas of each of the first through fourth pluralities of active areas being aligned in the first direction. A first portion of the plurality of gate structures and first through fourth pluralities of active areas is configured as a functional circuit, and a second portion of the plurality of gate structures and first through fourth pluralities of active areas is configured as one of a decoupling capacitor or an antenna diode.

In some embodiments, an IC device includes a plurality of gate structures extending in a first direction, wherein each of a first endmost gate structure and a second endmost gate structure of the plurality of gate structures extends continuously from a first endpoint to a second endpoint, first and second power rails extending in a second direction perpendicular to the first direction, wherein each of the first and second power rails is configured to carry a power supply reference voltage, the first power rail overlies the first endpoint of each of the first and second endmost gate structures of the plurality of gate structures, and the second power rail overlies the second endpoint of each of the first and second endmost gate structures of the plurality of gate structures, a third power rail extending in the second direction between the first and second power rails, wherein the third power rail is configured to carry a power supply voltage, and first through fourth pluralities of active areas extending in the second direction between the first and second endmost gate structures of the plurality of gate structures, the active areas of each of the first through fourth pluralities of active areas being aligned in the second direction. A first portion of the plurality of gate structures, a first subset of the active areas of the first plurality of active areas, and an entirety of each of the second through fourth pluralities of active areas are configured as a level shifter, and a second portion of the plurality of gate structures and a second subset of the active areas of the first plurality of active areas are configured as one of a decoupling capacitor or an antenna diode.

In some embodiments, a method of manufacturing an IC device includes, in a semiconductor wafer, forming first through fourth pluralities of active areas extending in a first direction, constructing a plurality of gate structures extending in a second direction perpendicular to the first direction, wherein the constructing the plurality of gate structures includes constructing each of first and second endmost gate structures extending continuously from a first endpoint to a second endpoint whereby the active areas of each of the first through fourth pluralities of active areas are aligned in the first direction between the first and second endmost gate structures, in a metal layer, and forming first through third power rails and a conductive segment extending in the first direction by overlying the first endpoint of each of the first and second endmost gate structures with the first power rail, overlying the second endpoint of each of the first and second endmost gate structures with the second power rail, extending the third power rail between the first and second power rails, and extending the conductive segment between the first and third power rails. The first through third power rails, a first portion of the plurality of gate structures, a first portion of the first plurality of active areas, and an entirety of the second through fourth pluralities of active areas are configured as a level shifter, and the conductive segment, a second portion of the plurality of gate structures, and a second portion of the first plurality of active areas are configured as one of a decoupling capacitor or an antenna diode.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. An integrated circuit (IC) device comprising:
   first and second power rails extending in a first direction, wherein each of the first and second power rails is configured to carry a power supply reference voltage;
   a third power rail extending in the first direction between the first and second power rails, wherein the third power rail is configured to carry a power supply voltage;
   a plurality of gate structures extending in a second direction perpendicular to the first direction, wherein each of a first endmost gate structure and a second endmost gate structure of the plurality of gate structures extends continuously from a first endpoint underlying the first power rail to a second endpoint underlying the second power rail; and
   first through fourth pluralities of active areas extending in the first direction between the first and second endmost gate structures of the plurality of gate structures, the active areas of each of the first through fourth pluralities of active areas being aligned in the first direction, wherein
      a first portion of the plurality of gate structures and first through fourth pluralities of active areas is configured as a functional circuit, and
      a second portion of the plurality of gate structures and first through fourth pluralities of active areas is configured as one of a decoupling capacitor or an antenna diode.

2. The IC device of claim 1, wherein
   the first portion of the plurality of gate structures and first through fourth pluralities of active areas comprises a first subset of the active areas of the first plurality of active areas and entireties of each of the second through fourth pluralities of active areas, and
   the second portion of the plurality of gate structures and first through fourth pluralities of active areas comprises a second subset of the active areas of the first plurality of active areas.

3. The IC device of claim 2, wherein
   the first subset of the active areas of the first plurality of active areas comprises first and second active areas, and
   the second subset of the active areas of the first plurality of active areas comprises a third active area positioned between the first and second active areas.

4. The IC device of claim 2, further comprising first through third n-wells, wherein
   each of the second and third pluralities of active areas comprises at least one active area positioned in each of the first through third n-wells.

5. The IC device of claim 1, wherein
   the first portion of the plurality of gate structures and first through fourth pluralities of active areas comprises a first plurality of gate structure portions, and the second portion of the plurality of gate structures and first through fourth pluralities of active areas comprises a second plurality of gate structure portions aligned in the second direction with, and electrically isolated from the first plurality of gate structure portions.

6. The IC device of claim 1, wherein the second portion of the plurality of gate structures and first through fourth pluralities of active areas is configured as the decoupling capacitor comprising:
   a conductive segment extending in the first direction between the first and third power rails, wherein the conductive segment is configured to carry the power supply voltage; and
   a plurality of via structures configured to couple the conductive segment to corresponding gate structures of the second portion.

7. The IC device of claim 1, wherein the second portion of the plurality of gate structures and first through fourth pluralities of active areas is configured as the antenna diode comprising:
   a conductive segment extending in the first direction between the first and third power rails, wherein the conductive segment is configured to carry an input signal of the functional circuit; and
   a plurality of via structures configured to couple the conductive segment to corresponding source/drain structures in one or more active areas of the first plurality of active areas.

8. The IC device of claim 1, wherein the functional circuit comprises a level shifter.

9. An integrated circuit (IC) device comprising:
   a plurality of gate structures extending in a first direction, wherein each of a first endmost gate structure and a second endmost gate structure of the plurality of gate structures extends continuously from a first endpoint to a second endpoint;
   first and second power rails extending in a second direction perpendicular to the first direction, wherein
      each of the first and second power rails is configured to carry a power supply reference voltage,
      the first power rail overlies the first endpoint of each of the first and second endmost gate structures of the plurality of gate structures, and
      the second power rail overlies the second endpoint of each of the first and second endmost gate structures of the plurality of gate structures;
   a third power rail extending in the second direction between the first and second power rails, wherein the third power rail is configured to carry a power supply voltage; and
   first through fourth pluralities of active areas extending in the second direction between the first and second endmost gate structures of the plurality of gate structures, the active areas of each of the first through fourth pluralities of active areas being aligned in the second direction,
   wherein
      a first portion of the plurality of gate structures, a first subset of the active areas of the first plurality of active areas, and an entirety of each of the second through fourth pluralities of active areas are configured as a level shifter, and
      a second portion of the plurality of gate structures and a second subset of the active areas of the first plurality of active areas are configured as one of a decoupling capacitor or an antenna diode.

10. The IC device of claim 9, wherein the second subset of the active areas of the first plurality of active areas is positioned between first and second active areas of the first subset of the active areas of the first plurality of active areas.

11. The IC device of claim 9, wherein the second portion of the plurality of gate structures and the second subset of the active areas of the first plurality of active areas are configured as the decoupling capacitor comprising:
   a conductive segment extending in the second direction between the first and third power rails, wherein the conductive segment is coupled to the third power rail; and
   a plurality of via structures configured to couple the conductive segment to corresponding gate structures of the second portion.

12. The IC device of claim 11, wherein each gate structure of the corresponding gate structures of the second portion
   overlies an active area of the second subset of the active areas of the first plurality of active areas, and
   is aligned in the first direction with, and electrically isolated from, a gate structure of the first portion of the plurality of gate structures.

13. The IC device of claim 9, wherein the second portion of the plurality of gate structures and the second subset of the active areas of the first plurality of active areas are configured as the antenna diode comprising:
   a conductive segment extending in the second direction between the first and third power rails, wherein the conductive segment is coupled to an input pin of the level shifter; and
   a plurality of via structures configured to couple the conductive segment to corresponding source/drain structures in one or more active areas of the second subset of the active areas of the first plurality of active areas.

14. The IC device of claim 13, wherein
   the source/drain structures are adjacent to corresponding gate structures of the second portion, and
   each corresponding gate structure is aligned in the first direction with, and electrically isolated from, a gate structure of the first portion of the plurality of gate structures.

15. The IC device of claim 9, wherein
   the plurality of gate structures is a first plurality of gate structures,
   the level shifter is a first level shifter,
   the one of the decoupling capacitor or the antenna diode is a first one of the decoupling capacitor or the antenna diode,
   the IC device further comprises a second plurality of gate structures and fifth through eighth pluralities of active areas,
   a first portion of the second plurality of gate structures, a first subset of the active areas of the fifth plurality of active areas, and an entirety of each of the sixth through eighth pluralities of active areas are configured as a second level shifter, and
   a second portion of the second plurality of gate structures and a second subset of the active areas of the fifth plurality of active areas are configured as a second one of the decoupling capacitor or the antenna diode.

16. A method of manufacturing an integrated circuit (IC) device, the method comprising:
   in a semiconductor wafer, forming first through fourth pluralities of active areas extending in a first direction;
   constructing a plurality of gate structures extending in a second direction perpendicular to the first direction, wherein the constructing the plurality of gate structures comprises:
      constructing each of first and second endmost gate structures extending continuously from a first endpoint to a second endpoint whereby the active areas of each of the first through fourth pluralities of active areas are aligned in the first direction between the first and second endmost gate structures; and
   in a metal layer, forming first through third power rails and a conductive segment extending in the first direction by overlying the first endpoint of each of the first and second endmost gate structures with the first power rail, overlying the second endpoint of each of the first and second endmost gate structures with the second power rail, extending the third power rail between the first and second power rails, and extending the conductive segment between the first and third power rails, wherein
      the first through third power rails, a first portion of the plurality of gate structures, a first portion of the first plurality of active areas, and an entirety of the second through fourth pluralities of active areas are configured as a level shifter, and
      the conductive segment, a second portion of the plurality of gate structures, and a second portion of the first plurality of active areas are configured as one of a decoupling capacitor or an antenna diode.

17. The method of claim 16, wherein an active area of the second portion of the first plurality of active areas is aligned between active areas of the first portion of the first plurality of active areas.

18. The method of claim 16, wherein the plurality of gate structures comprises discontinuities between gate structures of the first portion of the plurality of gate structures and gate structures of the second portion of the plurality of gate structures.

19. The method of claim 16, wherein the forming the first through third power rails and the conductive segment comprises configuring the decoupling capacitor by:
   constructing vias between gate structures of the second portion of the plurality of gate structures and the conductive segment; and
   forming an electrical connection between the conductive segment and the third power rail.

20. The method of claim 16, wherein the forming the first through third power rails and the conductive segment comprises configuring the antenna diode by:
   constructing vias between source/drain structures in active areas of the second portion of the first plurality of active areas and the conductive segment; and
   forming an electrical connection between the conductive segment and a signal node of the level shifter.

* * * * *